United States Patent Office 2,757,711
Patented Aug. 7, 1956

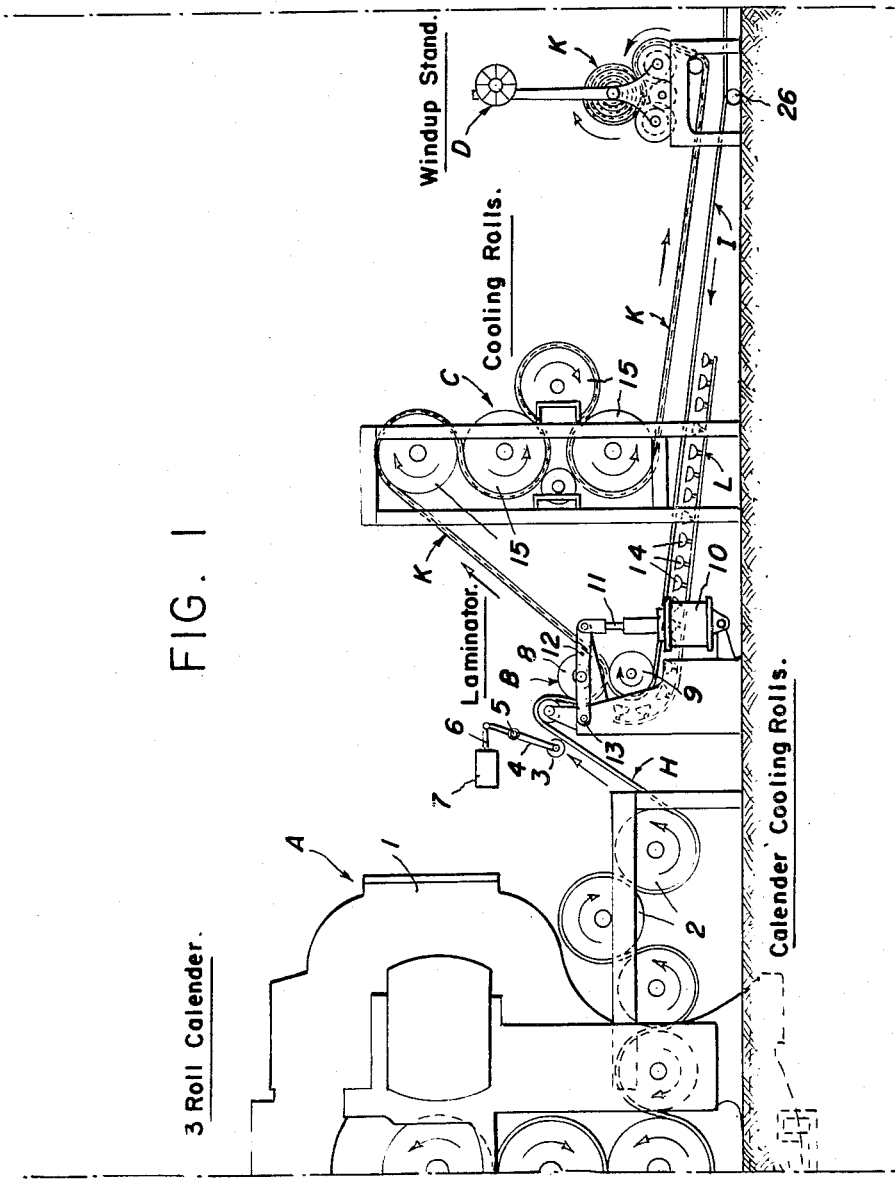

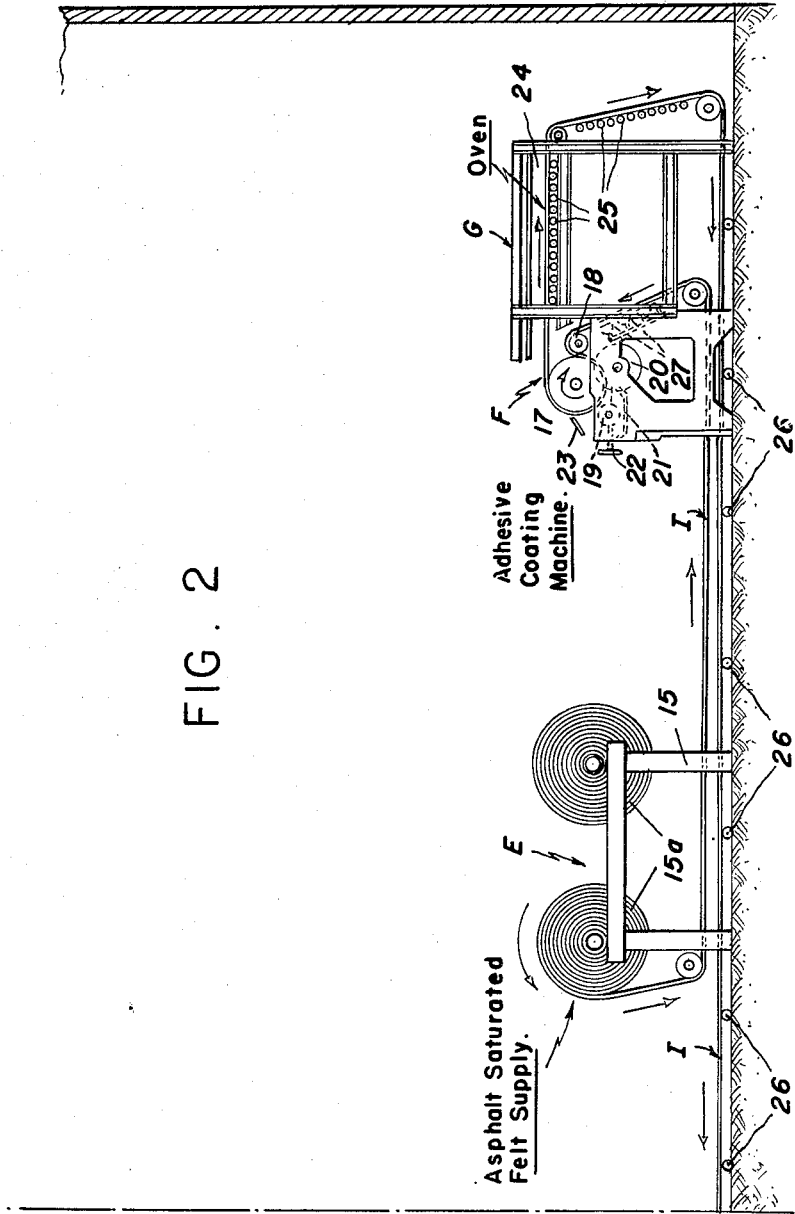

2,757,711

LAMINATED COVERING AND METHOD AND APPARATUS FOR MAKING SAME

Robert K. Petry, Wilmington, and John B. Weaver, Marshallton, Del., assignors to Congoleum-Nairn Inc., a corporation of New York Application May 5, 1952, Serial No. 286,184

29 Claims. (Cl. 154—20)

This invention pertains to the art of laminated coverings comprising a plastic sheet and supporting base and more particularly has reference to improvements in coverings suitable for floors, walls, articles of furniture and the like comprising a vinyl plastic sheet adhesively bonded to a base sheet and in the method of and apparatus for making such coverings.

In manufacturing such coverings it has been heretofore customary to produce a plastic sheet, then prepare the supporting base for attachment thereto, and finally laminate the sheet to the base by means of a previously applied adhesive, all in separate and distinct operations, in which both the sheet and base materials were wound into rolls for storage and subsequent transportation and use at the point where the laminating operation was performed.

In our improved process of manufacture, the three major steps mentioned are so performed that they can be carried out simultaneously and in a continuous operation using a single multiple unit apparatus, thus eliminating the extra cost, equipment and time involved in winding the plastic sheet and supporting base into rolls, transporting the rolls to separate laminating machines, and unwinding and laminating the plastic sheet with the base material in a separate operation. In addition to these substantial advantages, our improved process also overcomes several other disadvantages which were inherent in prior processes, including dimensional instability caused by the different coefficients of expansion of a vinyl plastic sheet and conventional supporting bases which is experienced during processing and the effects of unavoidable stretching necessary in conventional processing.

The present invention seeks to overcome the disadvantages of the prior art processes in a simple and economical manner. It is an object of the invention to provide a floor covering product of good dimensional stability having an excellent bond between the supporting base and the vinyl plastic wear layer. Another object is to decrease the amount of adhesive ordinarily required for the above. Another object is to make possible the use of a wider variety of adhesives and to eliminate the necessity of a special backing paint on the vinyl wear layer in those cases where it is to be joined to an asphalt impregnated backing. Still another object is to improve the resistance to surface indentation of a backed vinyl floor covering subjected to heavy loads.

It has now been discovered that the above and other important objects may be achieved by applying an adhesive to a base sheet in the form of a water emulsion, drying the adhesive on the base sheet, and then laminating the base sheet to a vinyl plastic surface felt in a single operation adjacent to calendering.

For the purpose of illustrating the foregoing and further objects and features of this invention relating to the method, apparatus, and materials employed, the invention, as set forth in more detail hereinafter, is described and illustrated in connection with the accompanying drawings in which:

Fig. 1 shows, diagrammatically, part of our improved apparatus comprising a calender unit A, a laminator unit B, a cooling unit C, and a windup unit D; and Fig. 2 shows, diagrammatically, the remainder of said apparatus, comprising an unwind unit E, a coating unit F and a drying unit G.

It will be understood that the several units shown in Figs. 1 and 2 are all integral parts of our improved apparatus, through which the components—vinyl plastic sheet H and base sheet I—of a laminated floor covering K, pass successively and continuously, as more particularly described hereinafter; and that this apparatus is shown in two figures for convenience of illustration.

The vinyl plastic sheet may be composed of any material or composition suitable for a covering for floors, walls, articles of furniture or the like. One such composition is disclosed in Patent No. 2,558,378 which issued to Robert K. Petry on June 26, 1951. Thus, a suitable composition is one containing from 25% to 50% by weight of a plasticized vinyl polymer and from 50% to 75% by weight of filler material including pigment and fibrous fillers, the fibrous filler preferably constituting less than about 50% by weight of the total filler. The vinyl polymer may be a material such as polyvinyl chloride, polyvinyl acetate, polyvinyl butyral, and a copolymer of vinyl chloride and vinyl acetate and may be employed with a compatible plasticizer such as tricresyl phosphate, dioctyl phthalate, dicapryl phthalate, dibutyl sebacate, dibutoxy ethyl phthalate, dibutoxyglycol phthalate, polyethyleneglycol di-2-ethyl hexoate, triethylene-glycol di-2-ethyl hexoate and the like in such proportions that about 7 to about 18 parts by weight of the plasticizer are employed in combination with about 16 to about 38 parts by weight of the vinyl polymer. It is to be understood that the foregoing is merely illustrative of suitable materials for the vinyl plastic sheet and that other materials and compositions comprising polyvinyl compounds may be employed in the practice of this invention. Any such or other compositions are to be regarded as coming within the scope of such terms as "vinyl plastic sheet" or "vinyl plastic material" as used hereinafter and in the claims. Vinyl plastic sheets of any desired thickness suitable for such coverings may be employed as, for example, ranging from about .01 to .125 inch in thickness.

Referring first to Fig. 1, the reference numeral 1 denotes the dicharge end of a conventional calender A which performs the finishing operation in the manufacture of a vinyl plastic sheet in the manner as more particulary disclosed in copending application Serial No. 43,274, filed August 9, 1948, by Robert K. Petry, now abandoned. Except for the additional cooling rolls 2, which are added to the discharge end of calender A, for the purpose of cooling the finished vinyl sheet H to room temperature, as will be more particularly described hereinbelow, the details of construction and operation of calender A as such form no part of this invention, although certain features of preferred practice of this invention relate to said calender and its employment in combination with the apparatus and method steps hereinafter described. The cooling rolls 2 are of the conventional type, each comprising a hollow steel cylinder, drilled for the circulation of water or other coolant, and having smooth, polished exterior surfaces over which the finished vinyl plastic sheet H passes to the laminator unit B.

In passing over the rolls 2 the vinyl plastic sheet H is cooled to a temperature substantially below that of the coating for the base sheet with which it is directed into contact and as aforesaid the base sheet throughout the thickness thereof is preferably at a higher temperature than the vinyl plastic sheet when the sheets are combined. In order that the curling of the resulting laminated sheet may be minimized the vinyl plastic sheet H in passing over the rolls 2 should be cooled from the elevated temperature appropriate for calendering such a sheet, e. g., about 250° F. to 350° F., to a temperature not exceeding about 120° F. by regulating the circulation of coolant through the rolls 2, and best results are obtained when the temperature of the sheet is kept at 90° F. to 100° F. Vinyl sheets have a much higher coefficient of expansion under temperature change than an asphalt impregnated felt base, for example, and if the vinyl sheet is laminated at temperatures substantially above 120° F., it contracts more on cooling to room temperature than does an asphalt saturated felt even when the asphalt impregnated sheet is cooled to room temperature from a higher temperature such as 200° F. Any such excess contraction of the vinyl plastic sheet would cause the laminated flooring to curl upwards. We have found that temperature control, as specified above, is effective to eliminate any such curling tendency when the base sheet is an asphalt saturated felt, although for other base sheets having a higher coefficient of expansion the temperature to which the vinyl plastic sheet is cooled could be somewhat higher. In order to produce optimum adhesive bonds, it is advisable to keep the vinyl sheet as close as possible to the maximum allowable temperature and not to effect lamination when the vinyl plastic sheet is at a temperature substantially below about 50° F. Too cold a vinyl sheet will rapidly take up heat from the heat activated adhesive coating with resultant tendency to reduce the efficiency of the bond although this effect can be counteracted by heating the adhesive coating to a higher temperature.

In order to prevent stretching of the vinyl plastic sheet between the cooling rolls 2 of calender A and the laminator B, which would result in a tendency of the laminated floor covering to curl, the tension on this unsupported vinyl sheet is controlled by a dancer roller device or follower which comprises a small idle roller 3 which rides on the edge of the vinyl sheet H in the unsupported stretch of the sheet H between the rolls 2 and the laminator B. This roller is carried on one end of a lever 4 which rocks about a fixed pivot 5 and is connected at its other end to a plunger 6 of a solenoid coil 7. Any variation in the slack or tension of the vinyl sheet H reciprocates plunger 6 in coil 7, and this in turn actuates an electronic control device (not shown) which varies the speed of an electric motor (not shown) that drives the laminator B, so as to compensate for any change in tension in the vinyl sheet H. It is thus seen that the rate of rotation of the laminating rolls of the laminator B is controlled by this device responsive to rate of travel of the vinyl plastic sheet discharged from the calender A. Preferably the rate of rotation of the laminating rolls is controlled so that the vinyl plastic sheet is substantially free of tension as it is fed into the laminator B. More generally it is desirable that any tension be avoided which would stretch the vinyl plastic sheet more than about 0.1% of its length. The minimizing of tension is particularly important in the travel of the vinyl plastic sheet from the cooling rolls 2 to the laminator B although such synchronization as minimizes tension at all points between the calender and the laminator B is desirable. To this end it is desirable that the electric motor driving calender A and that driving laminator B be synchronized by receiving their current from the same motor generator (not shown). While according to Fig. 1 the vinyl plastic sheet H is shown as being directed directly from the rolls of calender A to the cooling rolls 2 and thence to the laminator B, it is apparent that the continuity and effectiveness of the operation for the purposes of this invention would remain essentially the same if the vinyl plastic sheet H were to be subjected to some further handling during the progress of the sheet such as passing over one or more idler rolls or such as passing it over a roll presenting a heated surface before the sheet is cooled. If the vinyl plastic sheet H is not passed continuously from the calender A to the laminator B as aforesaid the improvements and advantages resulting from so doing to which reference has been made hereinabove are not realized. However, certain of the other novel features of this invention which are to be described hereinafter are such that the advantages resulting therefrom can be realized at least in part even if the vinyl plastic sheet H were not to be fed into the laminator continuously with the formation thereof but were to be fed otherwise into the laminator as from a previously produced roll.

The laminator B comprises a pair of hollow steel rolls 8 and 9, each drilled for the circulation of water or steam in the usual manner. The top roll 8 has a smooth, polished surface; whereas the bottom roll 9 is covered with a layer of cushioning material, such as neoprene rubber or the like, with a Shore A hardness of about 65, so that it can absorb any irregularities in the structure of the base sheet I to which the vinyl plastic sheet H is to be laminated, and not reflect them in the surface appearance of the laminated covering. If the base sheet I is smooth enough, a steel roll, identical with roll 8, can be substituted for the covered roll 9. The hardness of the covering on roll 9 can also be varied to suit the type of base sheet I that is used. For a rubber covering of about one inch thickness, we have found that a Shore A hardness of about 65 is the maximum degree of softness that will produce satisfactory results. Harder rubbers produce greater nip pressures between the rolls 8 and 9 and, therefore, tend to give better adhesive bonds. The water cooling of roll 9 prolongs the life of the rubber covering.

The pressure on the laminating rolls 8 and 9 is controlled by a pair of pneumatic cylinders 10, each located at an end of roll 8 and connected thereto by a piston rod 11 and a lever 12 which is mounted on a fixed pivot 13 and has the axle of roll 8 journalled therein. The pistons in cylinders 10 are operated by compressed air at pressures up to 125 pounds per square inch, so that the nip pressures on the rolls 8 and 9 can be controlled very accurately over a wide range of pressures. The pressure developed by the laminating rolls 8 and 9 is one of the major factors in controlling the adhesive bond between the vinyl plastic sheet H and supporting base I. While pressures ranging from 200 to 500 pounds per linear inch across the width of rolls 8 and 9 can be used, we have found that best results are obtained with pressures between 350 and 400 pounds per linear inch. The pressure that is employed is affected by other prevailing conditions including speed of rotation and hardness of the laminating rolls 8 and 9, and the temperature, amount and composition of the bonding adhesive used. The length of time that the sheets H and I are under pressure between rolls 8 and 9 depends upon the operating speed of the rolls. At slower speeds less pressure, heat or adhesive are required, but the optimum processing conditions as exemplified herein are based on speeds of lamination between 35 and 40 linear feet per minute of travel of sheets H and I through rolls 8 and 9. If the laminating speed is substantially increased, then it is well to increase the laminating pressure and the quantity of adhesive, and to enlarge the heating equipment for drying and activating the adhesive.

As the base sheet I (whose underside has been coated with adhesive in coating unit F, as hereinafter described) approaches the laminator B, it is heated on its coated side by heating equipment L, in order to activate the tack of the adhesive. This equipment L consists of banks of industrial, reflector-type, infra-red heating lamps 14 which are arranged below the travelling sheet I near laminator B, as shown in Fig. 1. While infra-red heating lamps have been mentioned any other source of infra-red radiation may be employed such as heated rods or glass screens. We have found that infra-red heating produces the quickest temperature rise in the adhesive coating on the base sheet I, and tends to concentrate the heat on the coated surface to a greater degree than other types of heat energy. According to principles well known in the art the rays of infra red preferably are concentrated in that range of wave length which is most effective to raise the temperature of the adhesive coating while minimizing the extent to which the body portion of the base sheet I becomes heated. The amount of heat required depends upon the speed of travel of sheet I and the desired maximum temperature. For the materials used in our invention process, we have found that the optimum temperature to which the adhesive coating on the base sheet I should be heated just prior to lamination is about 235° F. to about 240° F. Particularly when asphalt impregnated felt is used in our process as the base sheet I, the softening point of the asphalt limits the temperature to which the base may be subjected and the temperature to which the adhesive coating is heated should not be substantially above 260° F. In order to afford the desired tack and bonding strength the adhesive coating should be heated at least to about 215° F.

In order to heat the adhesive coating to the desired temperature the heat which is applied prior to laminating is directed on the adhesive coating on the surface of the base sheet and with a minimum of heat penetration into the base sheet. Since it is necessary to raise the adhesive coating to temperatures well in excess of the melting point of an asphalt saturant, for example, it is obvious that this heat must be concentrated on the surface, otherwise the saturant would melt, bleed through the back and probably weaken the felt sheet to such an extent that it would not hold together under the forces exerted during the laminating operation. Moreover, if the adhesive surface of the felt were to be heated much above the indicated temperatures, asphalt saturant immediately below the adhesive coating would melt and penetrate through the adhesive film and impair or destroy the bond to the vinyl sheet. The temperatures above indicated are obtained just prior to the laminating nip for, if the coated felt were held at such temperature for any prolonged period of time, the asphalt saturant would bleed through the adhesive to such extent as to make the lamination process inoperable. In all these operations involving rate of heating and the ultimate temperatures, the conditions for obtaining best results are dependent in part on the speeds of operation, and for speeds of operation such as that above mentioned the adhesive coating is brought to the desired temperature as rapidly as possible, namely, in about five to fifteen seconds depending on the disposition and character of the infrared heating elements. A heat activation period of more than about sixty seconds normally is undesirable, especially when an asphalt saturated base sheet is employed. While it is preferable, as aforesaid, for the base sheet I to become heated throughout its thickness as the result of the steps preceeding the laminating step to a temperature substantially higher, preferably at least about 50° F. higher, than the temperature of the vinyl plastic sheet which is directed into contact with the heat activated adhesive coating, nevertheless, and especially in the case of a base sheet consisting of a bitumen impregnated felt, it is desirable that surface of the base sheet opposite to the coated surface not become heated to a temperature higher than about 210° F. prior to lamination and preferably this surface of the base sheet does not become heated to a temperate higher than about 180° F. The temperature differential between the heat activated adhesive coating and the opposite surface of the base sheet ordinarily is at least about 40° F. and preferably is about 50° F.

The heating lamps 14 are varied so that individual rows or banks can be separately turned off or on, in order to properly control the temperature of the base sheet in accordance with the speed of lamination.

In order to cool the hot laminated sheet K issuing from laminator unit B, before it is wound into rolls on windup unit D, there is interposed between these units a cooling unit C which comprises a series of four cooling rolls 15 over which the laminated sheet K successively passes, as shown in Fig. 1. Cooling unit C is of the conventional type and rolls 15 are similar to cooling rolls 2 on calender A. In passing through cooling unit C, the laminated sheet K is reduced to room temperature in order to prevent any tendency of the impregnant for the base sheet to bleed out and onto the vinyl plastic sheet H when the laminated sheet K is wound into rolls on windup unit D, as shown in Fig. 1.

In the practice of the invention the base sheet I which is ordinarily employed is bitumen impregnated felt. Conventional flooring felt is suitable for the purpose and it is usually impregnated to the extent of about 100% to about 150% on the weight of the dry felt with a bituminous material such as asphalt which has a softening point of about 150° F., although felt base sheets having a lesser percent saturation may be employed. If the softening point of the bitumen impregnant is more than about 10° F. lower than 150° F. it becomes less desirable, especially for flooring purposes, due to its softness and resulting lowered resistance to bleeding and indentation. On the other hand if the softening point of the bitumen is more than about 10° F. higher than 150° F., it becomes less desirable due to its brittleness especially in cold weather. While the fibrous sheet which is used is ordinarily a felted fiber fabric, a woven fabric such as cotton duck or burlap may be employed and caused to be impregnated with a bituminous saturant such as that illustrated above and the term "fabric" is to be understood as applicable to both felted fabrics and woven fabrics. In addition to an impregnating material such as asphalt, one may, if desired, employ other waterproofing impregnants for the fabric of the base sheet such as pitches, rubber or rubber-like impregnants or resinous materials which provide the desired protection for the fibers of the base sheet and provide a tough and flexible base for the vinyl plastic sheet laminated therewith. The quantity of impregnant may vary very widely from only a few percent up to about 150% depending on the nature of the impregnant and the nature of the fabric. Thus a felt sheet containing about 6% of neoprene solids has been successfully laminated according to this invention.

While reference has been made above to the fact that materials other than bitumen impregnated felt may be employed as the base sheet I; nevertheless, because the base sheet I that is employed ordinarily is bitumen impregnated felt and because certain features of this invention are of especial and pecular applicability when the base sheet is in the form of a bitumen impregnated felt the feeding and coating of the base sheet has been illustrated and exemplified below in connection with a base sheet of bitumen impregnated felt although it is to be understood that other fabric base sheets impregnated with a suitable waterproofing material may also be employed.

Referring now to Fig. 2 the supply of bitumen impregnated felt whereby it may be continuously fed and which is designated as the unwinding unit E, comprises a stand 15 upon which is mounted a pair of wound up rolls 15a of bitumen impregnated felt which forms the supporting base sheet I of the laminated sheet K. Preferably two rolls of felt 15a are mounted on stand 15 so that when one is completely unwound the other can be fed to the coating unit F without interruption while a new roll is being substituted for an expended roll.

Upon entering the coating unit F the felt sheet I is preheated by a series of infrared radiant heating lamps 27 similar to lamps 14. The felt coating unit F comprises a coating drum 17, a coacting idle roll 18 and the applicator roll 19. Drum 17 is rotated at a regulated speed by a motor 20 and is heated internally by circulating steam to a temperature of approximately 250° F.–300° F. While the felt sheet I is thus being heated from its bottom surface, a liquid adhesive which is in the form of an aqueous emulsion or dispersion and which is contained in a pan 21 is applied to the other surface of the felt sheet by the applicator roll 19. This roll 19 is driven by connecting gears from the coating drum so that its peripheral speed will be the same as that of the coating drum. The contact pressure of applicator roll 19 on sheet I is regulated by an adjusting screw 22, so that an excess amount of adhesive is applied to said sheet. A doctor blade 23, positioned above roll 19, removes the excess adhesive so as to obtain a uniform thin coating. The applicator roll 19 is drilled for circulation of water or steam to provide temperature control for the adhesive being applied to the felt sheet I. Orinarily it is desirable that the roll 19 be maintained at a temperature substantially lower than that of the drum 17 so as to prevent the adhesive from becoming excessively fluid, and water at about room temperature may advantageously be used to cool the roll 19. Since the excess adhesive, removed from the heated felt sheet I by doctor blade 23, has been warmed its viscosity is materially changed. Uniformity of application of the adhesive can be readily subjected to control by control of the temperature of the adhesive as it is applied so as to provide desired viscosity. The liquid adhesive is desirably applied so that after it has dried the solids in the dried coating will be distributed at the rate of from about .03 to about .15 pound per square yard although it is ordinarily desirable that the dried coating weigh not over about .1 pound per square yard. For providing good adhesion as well as optimum conditions for drying and subsequent heat activation it is preferable that the dried coating weigh from about .04 to about .05 pound per square yard and it is one of the advantages of this invention that effective bonding can be obtained when an adhesive film of such thinness is employed.

From the coating unit F, the wet coated sheet I passes through drying unit G which comprises a heating oven 24, having steam heated plates or infra-red radiant heating elements 25 over which the felt sheet I passes with its dry bottom surface adjacent said plates so that in typical operation the bottom surface of the felt sheet is heated to approximately 150° F. and the adhesive coated surface is heated to about 125° F. As with the drum 17 the plates or radiant heating elements 25 heat the felt sheet I and, in turn, the emulsion adhesive from the bottom out. By thus heating the emulsion adhesive entirely or primarily from its back, rather than its surface, the water is driven out of the emulsion film very rapidly. If excessive heat is applied to the coated surface a dried membrane forms over the adhesive film and prevents rapid removal of the water which in turn results in slow drying. At the same time fast drying has the economic advantage of reducing space and initial expense of equipment and operating costs. Accordingly, the heat of oven 24 is adjusted to give optimum drying speed. When the adhesive coated felt sheet I leaves oven 24 it is dry but still warm and slightly tacky.

In order to secure maximum efficiency from the adhesive, it is desirable to retain the bulk of the adhesive solids on the surface of the felt. Accordingly, it is desirable to dry the adhesive rapidly and not to heat the felt sheet to an extent which tends to increase the rate of any absorption into the felt. It is preferable to at least initiate the heating of the felt prior to application of the liquid coating thereto so that drying of the coating will be accelerated due to the pre-heated condition of the felt as soon as the coating is applied. The heat of the drum 17 applied to the back surface of the felt and the heat supplied by the lamps 27 to the surface of the felt to be coated serve this purpose. While the surface of the drum is preferably maintained at a temperature of about 250° F. to 300° F., the period during which the felt is in contact therewith is so short that the felt is not excessively heated. However, if the drum 17 is maintained at a temperature substantially above 300° F., the degree to which the felt is heated tends to cause undue soaking into the felt of the liquid adhesive applied thereto. This results in impairment of the bond of the felt sheet with the vinyl plastic sheet unless additional quantities of the adhesive are applied. It is preferable that the felt base sheet become so heated that while the drying of the coating takes place the aforesaid temperatures of about 150° F. and 125° F. for the bottom and coated surfaces, respectively, of the felt sheet are realized. Generally it is not desirable to heat the felt so that the temperature of the bottom surface of the felt or any other portion of the felt rises above about 170° F. and preferably the heating is effected so that the temperature of the coated surface of the felt sheet is at least about 20° F. lower than that of the opposite or bottom surface. Heating of the felt sheet so that the temperature thereof, and more particularly that of the bottom surface thereof, is of the range 140° F. to 160° F. represents good practice. While the drying can take place at lower temperatures than those indicated, a longer drying time and correspondingly longer travel of the felt during drying is required as well as some impairment of the adhesive attributes of the exposed surface of the coating, and for these reasons the heating of the felt so that the bottom surface thereof is at least about 130° F. is desirable. It is preferable that the liquid coating dry to such consistency that it does not tend to become further absorbed into the felt in about fifteen seconds to about twenty seconds although, subject to the above mentioned disadvantages, a substantially greater drying time may be utilized. The optimum temperature conditions above mentioned are based on the above mentioned operating speeds of about 35 to 40 linear feet per minute of the advancing felt base sheet.

From oven 24 and the region of the heating elements 25 the sheet I is conveyed on an open roller conveyor (denoted by rollers 26) to the laminator B and, as described above, the temperature of the adhesive coating on the surface of the felt sheet I is raised, preferably to a temperature of 235° F. to 240° F., by the infra-red heating lamps 14 just prior to lamination. Since the asphalt saturated felt sheet I is not rewound into rolls after the adhesive is applied (as in prior art processes), the necessity for using a non-blocking type of adhesive is eliminated. This permits the use of a wider range of less expensive adhesive materials than were previously feasible. Also, our new method of applying the adhesive to the felt base, which permits lamination immediately after the water has been removed from the adhesive, produces far superior adhesive bonds between the vinyl sheet H and supporting base I with a lesser amount of adhesive.

As regards the adhesive which is employed in the practice of this invention the adhesive solids which are contained in the aqueous dispersion or emulsion are water-insoluble and are heat-activatable in that after the coating has become dried, the dried coating upon heat-activation and pressure lamination will provide an adhesive bond between the vinyl plastic sheet H and the base sheet I. Adhesive material for the dried coating is employed which is solid at ordinary atmospheric temperatures in that at such temperatures a good bond is provided between the vinyl plastic sheet and the base sheet and which has a softening point or is adapted to be rendered tacky at the aforesaid temperatures of the order of 215° F. to 260° F. While elastomers have only a low degree temperature susceptibility or thermoplasticity, nevertheless, elastomers are susceptible to heat-activation to increase the tack thereof so as to more readily form a strong bond under pressure when in the heated state; and the employment of an elastomer comprised in the solid adhesive material to the extent of at least 40% by weight thereof constitutes an important feature of preferred practice of this invention. The employment of the elastomer not only provides a stronger and more permanent bond between a vinyl plastic sheet and a base sheet such as bitumen impregnated felt but also provides a strong bond even when the adhesive film is thin and provides an adhesive layer that retains its desired characteristics of strength and toughness under varying conditions of temperature encountered in storage and use. Preferably the adhesive material contains an elastomer in admixture with a water-insoluble thermoplastic resinous material. Preferred adhesives for obtaining good bond strength over a wide range of service conditions comprise or consist essentially of an elastomer which is heat activatable at a temperature of the order of 215° F. to 260° F. and a water-insoluble thermoplastic resin having a softening point of about 215° F. to about 260° F.

For providing an adhesive bond between a vinyl plastic sheet and a base sheet of bitumen impregnated felt which is especially effective from the point of view of strength, low susceptibility to temperature change, and retention of strength notwithstanding stresses imposed on the finished product because of variations in temperature and humidity the adhesive which we employ according to a further feature of preferred practice of this invention is one which consists essentially of adhesive material selected from the group consisting of synthetic rubber latex and thermoplastic resin material compatible therewith which is solid at normal atmospheric temperatures and has a softening point below about 260° F., the synthetic rubber elastomer constituting at least about 40% by weight of the solids. Resin material in the form of a modified rosin such as a rosin extract or a decarboxylated rosin or a glyceryl ester of hydrogenated rosin, of desired softening point possesses especially advantageous properties in combination with synthetic rubber elastomer.

The preferred adhesive material employed according to this invention is exemplified by a mixture of rubber latex and "Vinsol" resin emulsion. A buna rubber latex is preferably employed in the form of a colloidal suspension of about 50% by weight of small (1800 Angstrom units) negatively charged, solid, spherical particles of 35% butadiene—65% acrylonitrile rubber, in a water solution of a fatty acid soap, such as "Hycar" latex, made by B. F. Goodrich Chemical Company. A film of this rubber emulsion has excellent adhesive characteristics for both vinyl films and most other materials, such as asphalt saturated felt used as a supporting base in plastic floor coverings. The "Vinsol" resin, made by Hercules Powder Company, is a hard, dark, high melting (234° F. to 239° F.) thermoplastic resin which is a by-product in the extraction of wood rosin from pine stumps and is made by extracting pine wood chips with benzene. The benzene is then removed and gasoline and furfural are added. The "Vinsol" is extracted in the furfural fraction. The use of the "Vinsol" resin serves to reduce costs and to provide an adhesive film which is less sticky at room temperatures, and being in the form of a water emulsion it is suitable for incorporation with the rubber latex.

Adhesive bonds can be produced using Hycar-Vinsol combinations varying from 100% Hycar latex to 40% Hycar solids and 60% Vinsol solids. As mentioned previously, increased Vinsol contents reduce the tendency of the dried film of adhesive to be sticky at room temperatures. This is important where the felt is coated with an adhesive in a separate operation and must be wound up for transportation to and use at the laminating operation. Where Hycar-Vinsol combinations are used optimum characteristics result from a combination of 60 parts Hycar latex solids and 40 parts Vinsol emulsion solids.

In order to prevent foaming of the liquid adhesive during the process of mixing its water emulsion ingredients and also during the process of applying the liquid adhesive to the felt base, it is advisable to add an anti-foaming agent, such as pine oil or a silicone oil such as "Antifoam A", made by the Dow-Corning Company. The pine oil which may be used is a regular run, high boiling, solvent and steam extract of the volatile components of pine stumps, such as "Yarmor 302", made by the Hercules Powder Company, and the amount required as an anti-foam may vary from .01 part to .04 part of pine oil per 100 parts of rubber and resin solids. While satisfactory results can be obtained by using pine oil as an anti-foam agent, its efficiency is relatively low as compared with a silicone oil since approximately ten times as much pine oil is required as with the use of silicone oil, such as Dow-Corning Antifoam A, which is a 30% solids emulsion of silicone oil in water. Thus, we have found that best results are obtained by using .002 parts of Dow-Corning Antifoam A per 100 parts of rubber and resin solids.

The following chart shows the properties of bond-uniformity, blocking tendency and shear strength of buna rubber-Vinsol adhesives in varying proportions at an applied weight of .04 dry pounds per square yard:

| Buna Latex Solids (percent) | Vinsol Solids (percent) | Uniformity of Bond | Blocking at 10 lbs./sq. in. Pressure | Shear rate in Seconds per sq. in. |
|---|---|---|---|---|
| 50 | 50 | Good | None | |
| 54.5 | 45.5 | do | do | 31 |
| 57.5 | 42.5 | do | do | 60 |
| 60 | 40 | do | do | 92 |
| 65 | 35 | do | Slight | 102 |

Summarizing the foregoing satisfactory bonding results can be obtained with adhesives having the following range of ingredients, per 100 parts of rubber and resin solids:

|  | Parts |
|---|---|
| Buna rubber latex | 60 to 70 |
| Vinsol emulsion solids | 30 to 40 |
| Silicone oil | 0.001 to 0.004 |
| or |  |
| Pine oil (in place of silicone oil) | 0.01 to 0.04 |

Another adhesive which has bad blocking characteristics but can produce satisfactory laminated floor coverings with the apparatus and by the method herein disclosed consists of the following:

55 parts solids of buna rubber latex
31 parts solids of "Dresinol 42"
14 parts solids of Vinsol emulsion
.002 part Dow-Corning Antifoam A solids "Dresinol 42" is the brand name given by Hercules Powder Company to their emulsion of decarboxylated "K" gum rosin. The use of Dresinol produces a more tacky heat sensitive adhesive and requires slightly less buna rubber to form satisfactory bonds than when large percentages of the harder Vinsol resin are used. This adhesive blocks badly but, otherwise, performs well.

While we have described the preferred form of our novel adhesive composition it should be understood that our invention process of making laminated plastic floor coverings is not limited to the use of this particular adhesive. On the contrary, owing to the novel combination and arrangement of steps in said process, wherein the vinyl plastic film is bonded to its supporting base continuously and immediately after said film leaves the calender and immediately after said base is coated with adhesive there is no necessity for using non-blocking types of adhesive, such as required in prior art processes, where the adhesive-coated felt base is wound into rolls before laminating. Accordingly, we have found that a much wider range of adhesives, including those with poor anti-blocking qualities, may be used successfully in our improved process of manufacturing laminated plastic floor coverings.

A latex adhesive which gives good results in our improved process consists of the following:

42 parts of buna rubber latex solids
21 parts of Geon 31X latex solids
37 parts of Vinsol emulsion solids
.002 part of Dow-Corning Antifoam A solids While this adhesive composition gives good bonds and satisfactory anti-blocking characteristics, it is more expensive and less stable than our preferred adhesive composition. Geon 31X is the trade name applied to a vinyl chloride resin latex by the B. F. Goodrich Chemical Company. The vinyl chloride resin in the latex is an elastomer.

Adhesive compositions containing no buna rubber can also be processed on the apparatus and by the method herein disclosed. Thus, the following adhesive provides good bonds, but if wound up in rolls before laminating would block or stick badly:

48 parts solids of Geon 31X emulsion
28 parts of "Paraplex G40" solids
24 parts of Vinsol emulsion solids
.002 part Dow-Corning Antifoam A solids The "Paraplex G40," as made by Rohm and Haas Company is a high molecular weight polyester plasticizer compatible with polyvinyl resins. In this adhesive it imparts flexibility and tack to the Vinsol and Geon solids. Since it is supplied as a 100% solids material it must be emulsified before mixing with the Geon and Vinsol emulsions. The emulsion is made by slowly adding 38 parts of water, containing 2 parts of 26% $NH_3$, to 40 parts of Paraplex G40 and 0.5 part of oleic acid, mixing with a high speed stirrer. Another method of emulsifying Paraplex G40 is to dissolve 1.5 parts of polyvinyl alcohol in 60 parts of water at 180° F. and mix with 38.5 parts G40 heated to 180° F. with vigorous agitation.

The foregoing are illustrative of adhesive compositions which we have used satisfactorily. It is desirable that the adhesive comprise an elastic film former having at least limited compatibility with and capacity to adhere to the binder in the vinyl plastic sheet such as a buna rubber and related elastomers, e. g., butadiene-acrylonitrile rubber, butadiene-styrene rubber, and polyisobutylene, or a vinyl resin elastomer, e. g., polyvinyl chloride, polyvinyl acetate, polyvinyl chloride-acetate, and polyvinyl-vinylidene chloride, or an elastomeric acrylic polymer which have the advantage of providing especially good adhesion both to the vinyl plastic sheet and to a base sheet such as asphalt impregnated felt. The resin modifying agent is preferably added to provide greater hardness to the adhesive film which in turn produces stronger bonds. The resin also produces greater tack at elevated temperatures and acts as an extender to reduce the cost of the adhesive. The resin should be compatible with the elastomer and have at least limited compatibility with the binder in the vinyl plastic sheet, and it is desirable to blend the resin and elastomer in relative proportions which give good adhesion to the vinyl plastic sheet. The adhesive must be fluid so that it can be applied to the film with conventional coating equipment. Water dispersions are used since the water does not attack the asphalt saturant in the felt. If other solvents were used to produce fluidity, they would attack the asphalt and impair the adhesive characteristics of the film. The use of water is also much safer and more economical.

By using adhesive ingredients in a water emulsion form compounding of the adhesive is greatly simplified. Thus, in preparing an emulsion of buna rubber latex and Vinsol emulsion these materials are charged into a mixing tank using a 40 mesh screen to remove skins and lumps which may be present. The antifoaming agent is diluted to at least 20 times its volume and added to the mixture. Mixing may be accomplished with a low speed Dorr-type mixing blade which sweeps the interior of the mixing vessel at approximately five revolutions per minute. Mixing is complete in four to six hours when 1000 gallon batches are made but may conveniently be mixed for sixteen-hour periods if required. Continued agitation will prevent skinning, which occurs if the mixture stands for extended periods of time without stirring. The mixed adhesive may be stored in closed drums for several weeks without risk of damaging the emulsion. Protection from freezing or excessive heat should, however, be maintained at all times.

Uniformity of weight application of adhesive to the felt, the drying rate and the degree of adhesive penetration into the felt are all affected by the viscosity of the adhesive composition. Best results are obtained when this viscosity is high, namely, when the aqueous adhesive composition as made up at ordinary temperatures has a consistency similar to very heavy cream or mayonnaise. Both the buna rubber latex and the Vinsol resin emulsion, for example, are low in viscosity but mixtures of these ingredients thicken rapidly depending upon the total solids content and the proportions of one ingredient to the other. Because of this viscosity can be controlled as desired according to the amount and proportions of the total solids in the adhesive. Thus, viscosity can easily be adjusted by adding more or less water to the mix. However, in some instances even with a minimum of water insufficient viscosity is obtained when the ingredients are properly compounded. In such cases we use concentrations of carboxymethylcellulose varying from $\frac{1}{10}$ to $\frac{5}{10}$ of 1% based on the total weight of adhesive used. By means of this thickening agent any range of viscosity can be obtained without impairing the bonding characteristics or stability of the adhesive. Conversely water will reduce the viscosity of those adhesives which become too thick for proper application either because of long aging or irregularities in the raw materials used. Moreover, viscosity can be adjusted by controlling the temperature of the applied aqueous dispersion as has been pointed out hereinabove.

If the adhesive is applied to the felt and dried in a separate operation, as in prior art processes, an application of approximately 0.10 pound of adhesive solids per square yard is required to produce satisfactory bonds on our laminating equipment. The conventional method of drying this adhesive is to festoon the adhesive coated felt in large drying ovens maintaining the temperature from 80° F. to 110° F. Air drying results in one or two hours at these temperatures. Temperatures above 120° F. for such periods of time reduce the sensitivity of the adhesive. When the coated felt is removed from the festoon and wound into rolls, the temperature must be below 100° F. to prevent sticking or blocking. Such disadvantages are obviated by our improved process. Thus, by our application of the adhesive as the base sheet progresses in being fed into the laminator and when the lamination is performed immediately after the drying and activation of the adhesive only 0.04 to 0.05 pound of the same adhesive solids per square yard are required in order to produce satisfactory bonds. This relatively thin film can be dried by heating from the bottom up in a matter of seconds.

While we have shown and described the preferred embodiment of our invention, we desire it to be understood that we do not limit ourselves to the precise details of apparatus or process steps disclosed by way of illustration as these may be changed and modified by those skilled in the art without departing from the spirit of our invention or exceeding the scope of the appended claims.

We claim:

1. A method of making a laminated covering of the character described which comprises continuously feeding and advancing a fabric sheet impregnated with a waterproofing material, applying to a surface of said sheet as a superficial coating an aqueous dispersion of a heat-activatable water-insoluble adhesive material, drying said coating to form a dried coating of substantial thickness on said surface of said sheet, activating the tack of said dried coating by heating said coating while maintaining the temperature of the opposite surface of said sheet substantially lower than that to which said coating is heated, subjecting vinyl plastic material to calendering at elevated temperature to continuously form a calendered sheet, continuously cooling the calendered sheet after said calendering to a temperature substantially lower than that of said coating, continuously directing the cooled calendered sheet into contact with said heat-activated coating on said surface of said fabric sheet, and subjecting the so-combined sheets to pressure with said heat-activated coating therebetween.

2. A method of making a laminated covering of the character described which comprises continuously feeding and advancing a sheet of bitumen impregnated felt, applying to a surface of said sheet as a superficial coating an aqueous dispersion of a heat-activatable water-insoluble adhesive material, drying said coating to form a dried coating of substantial thickness on the surface of said felt, said drying being accelerated by heating said sheet and said coating while maintaining the temperature thereof not substantially above about 170° F., heating the dried coating to a temperature of about 215° F. to about 260° F. to activate the tack of said coating of adhesive material without raising the temperature of the opposite surface of said sheet substantially above 210° F., continuously subjecting vinyl plastic material to calendering at elevated temperature, cooling the resulting calendered sheet as it progresses from the calendering step to a temperature not substantially above 120° F., continuously feeding the calendered sheet as it progresses from the cooling step into contact with said heat-activated coating, and immediately subjecting the so-combined sheets with said adhesive coating therebetween to pressure of about 200 to 500 pounds per linear inch.

3. A method according to claim 2 wherein said heating of said felt sheet to accelerate the drying of said coating is effected prior to and subsequent to the application of said coating and wherein during the drying of said coating the temperature of the coated surface of said felt sheet is maintained at least about 20° F. lower than that of the opposite surface.

4. A method according to claim 2 wherein the calendered sheet is directed from the calendering step into contact with said heat-activated adhesive coating without subjecting said sheet to substantial tension.

5. A method according to claim 2 wherein at least about 40% by weight of the solids in the dried coating consists of elastomer material.

6. A method according to claim 2 wherein said coating is applied at such rate that the solids in the dried coating are disposed on said surface of said felt sheet at the rate of about .03 to about .15 pound per square yard, and wherein said solids consist essentially of elastomer and thermoplastic resin, at least about 40% by weight of said solids consisting of said elastomer.

7. A method of making a laminated covering of the character described which comprises continuously feeding a fabric sheet impregnated with a waterproofing material and successively during the progress of said sheet applying to a surface of said sheet as a superficial coating an aqueous dispersion of a heat-activatable water-insoluble adhesive material, drying the coating to remove water therefrom leaving a coating of the adhesive solids on said surface of said sheet, activating the tack of the dried coating by heating said coating while maintaining the temperature of the opposite surface of said sheet substantially lower than that to which said coating is heated, directing into contact with said heat-activated coating a preformed vinyl plastic sheet which is at a temperature substantially below that of said coating and subjecting the so-combined sheets to pressure with said heat-activated coating of adhesive material therebetween.

8. A method of making a laminated covering of the character described which comprises applying as a superficial coating to the surface of a fabric sheet impregnated with a waterproofing material an aqueous dispersion of a heat-activatable water-insoluble adhesive material, drying said coating to remove water therefrom leaving a coating of substantial thickness of the adsesive solids on the surface of said sheet, said drying being accelerated by heating said sheet and said coating to a superatmospheric temperature not substantially above 170° F., activating the tack of the dried coating by subjecting the coating to infra red radiant heat until said coating is heated to a temperature of about 215° F. to about 260° F. while maintaining the opposite surface of said sheet at a temperature not above about 200° F., depositing on said heat-activated coating at said temperature a preformed vinyl plastic sheet which is at a temperature substantially lower than that of said heat-activated coating, and thereupon subjecting the so-combined sheets to pressure.

9. A method according to claim 8 wherein the pressure to which the combined sheets is subjected is applied at the nip between laminating rolls and is about 200 to about 500 pounds per linear inch.

10. A method according to claim 8 wherein during the drying step the surface of the applied coating in contact with the fabric sheet is heated to a temperature substantially higher than that of the exposed surface of said coating.

11. A method according to claim 8 wherein said vinyl plastic sheet is deposited on said heat-activated coating while said fabric sheet throughout its thickness is at a substantially higher temperature than that of said vinyl plastic sheet.

12. A method of making a laminated covering of the character described which comprises continuously feeding a sheet of bitumen impregnated felt, applying to an exposed surface of said felt sheet during advancement of said sheet an aqueous dispersion of a heat-activatable water-insoluble adhesive material to provide a superficial coating wherein the solids are distributed at the rate of about .04 to .1 pound per square yard, immediately after said adhesive application and during further advancement of said sheet subjecting the surface of said sheet opposite to said coating to heat effective to heat said surface to a temperature of the order of 140° F. to 160° F. and thereby heat the body portion of the sheet to a temperature substantially higher than that of said coating, continuing the advancement of said sheet until said coating is substantially dry, thereafter heating the coating to a temperature of about 215° F. to about 260° F. during further advancement of said sheet by subjecting same to radiant infra-red heat for a period not over about 60 seconds while maintaining the opposite surface of said sheet at a temperature not above about 180° F., continuously combining said sheet with a preformed sheet of vinyl plastic material at a temperature not above about 120° F. with said heat-activated coating therebetween, and thereupon passing the combined sheets between laminating rolls which subject said sheets to a pressure of about 200 to about 500 pounds per linear inch during their passage therebetween.

13. A method according to claim 12 wherein at least about 40% by weight of the adhesive solids in said aqueous dispersion of heat-activatable adhesive material consists of an elastomer.

14. A method of making a laminated covering of the character described which comprises continuously feeding a sheet of bitumen impregnated felt and successively during the progress of said sheet applying to a surface of said sheet an aqueous dispersion of a heat-activatable water-insoluble adhesive material, drying the coating to remove water therefrom leaving a dried coating of substantial thickness on the surface of said felt sheet, said drying being accelerated by heat applied to the surface of said felt sheet opposite to said coating and the temperature of the sheet during the drying of said coating not substantially exceeding about 170° F., activating the tack of the dried coating by heating said coating to a temperature between about 215° F. and about 260° F. while maintaining the opposite surface of said sheet at a temperature not above about 210° F., directing into contact with said heat-activated coating at said temperature a preformed vinyl plastic sheet which is at a temperature substantially below that of said felt sheet throughout the thickness thereof, and thereupon subjecting the so-combined sheets to pressure of about 200 to about 500 pounds per linear inch between laminating rolls.

15. A method according to claim 14 wherein said coating is applied at such rate that the solids in the dried coating are disposed on the surface of said felt sheet at the rate of about .03 to .15 pound per square yard and wherein said solids consist essentially of adhesive material selected from the group consisting of elastomer and thermoplastic resin material, said elastomer constituting at least about 40% by weight of said solids.

16. A method according to claim 14 wherein said coating is applied at such rate that the solids in the dried coating are disposed on the surface of said felt sheet at the rate of about .03 to about .15 pound per square yard, and wherein said solids consist essentially of synthetic rubber and modified rosin, said synthetic rubber constituting at least about 40% by weight of said solids.

17. A method according to claim 14 wherein said coating is applied at such rate that the solids in the dried coating are disposed on the surface of said felt sheet at the rate of about .03 to about .15 pound per square yard and wherein said solids consist essentially of about 60 to 70 parts by weight of buna rubber and about 30 to 40 parts by weight of rosin extract having a softening point of about 234° F. to about 239° F.

18. A method according to claim 14 wherein said coating is applied at such rate that the solids in the dried coating are disposed on the surface of said felt sheet at the rate of about .03 to .15 pound per square yard and wherein said solids consist essentially of synthetic rubber elastomer, vinyl chloride elastomer and thermoplastic rosin extract, the elastomer component of said solids being at least 40% by weight.

19. A method according to claim 14 wherein said coating is applied at such rate that the solids in the dried coating are disposed on the surface of said felt sheet at the rate of about .03 to .15 pound per square yard and wherein said solids consist essentially of vinyl chloride elastomer, a resinous plasticizer therefor and a thermoplastic rosin extract, said elastomer constituting at least about 40% by weight of said solids.

20. A method according to claim 14 wherein during the drying of said coating the felt sheet is heated to a temperature substantially higher than that of said coating so as to heat the coating during the drying thereof from underneath the coating, wherein the dried coating is heat-activated by exposure to infra red radiant heat, wherein during said heat-activation of the dried coating and prior to lamination the surface of the felt sheet opposite to said coating does not rise substantially above 170° F., and wherein said preformed vinyl plastic sheet is directed into contact with the heat-activated coating at a temperature not above about 120° F.

21. Apparatus for the manufacture of a laminated covering of the character described comprising a vinyl plastic sheet adhesively bonded to a fabric base sheet which comprises in combination feeding means for continuously feeding said fabric base sheet, a rotatable coating drum, means for directing said base sheet from said feeding means onto the surface of said coating drum and for carrying same on the surface of said drum through a substantial distance during the rotation of said drum, means for heating said drum, adhesive applying means for applying as a coating to the exposed surface of said base sheet while carried on the surface of said drum and aqueous dispersion of adhesive material, a pair of laminating rolls, means for exerting a predetermined pressure at the nip between said rolls, means for directing said base sheet from said coating drum into the nip between said laminating rolls, means for heating the surface of said base sheet opposite the adhesive coating applied by said adhesive applying means during the initial portion of the travel of said sheet in being directed from said coating drum to said laminating rolls to thereby accelerate the drying of said applied coating, means for directing radiant heat directly onto said coating to heat-activate same during the latter portion of travel of said sheet in being directed from said coating drum to said laminating rolls, a calender adapted to continuously discharge a calendered vinyl plastic sheet, means for directing said calendered vinyl plastic sheet from said calender into the nip between said laminating rolls with a surface thereof in contact with said adhesive coating, rotatable cooling rolls adapted and arranged to carry said calendered vinyl plastic sheet on the surfaces thereof during travel of said sheet from said calender to said laminating rolls and thereby cool said sheet, means for rotating said laminating rolls, means for controlling the rate of rotation of said laminating rolls in synchronism with the rate of discharge of said calendered vinyl plastic sheet from said calender, and means for cooling the resulting laminated sheet after leaving said laminating rolls.

22. Apparatus for the manufacture of a laminated covering of the character described comprising a vinyl plastic sheet bonded to a fabric base sheet which comprises in combination adapted for continuous and simultaneous operation a calender adapted to continuously discharge a calendered vinyl plastic sheet, feeding means for continuously feeding a fabric base sheet, a pair of laminating rolls, means for effecting rotation of said laminating rolls, means for exerting pressure at the nip between said laminating rolls, means for directing the travel of said base sheet from said feeding means into the nip between said laminating rolls, means for applying to one surface of said base sheet during its travel from said feeding means to said laminating rolls a coating of liquid adhesive material, means for heat drying the applied coating during continuance of said travel of said base sheet, means for heat-activating said coating during a subsequent portion of said travel of said sheet, and means for directing said calendered vinyl plastic sheet from said calender into the nip between said laminating rolls in pressure contact with said coating on said surface of said base sheet.

23. Apparatus according to claim 22 which includes means for cooling said laminated vinyl plastic sheet during its travel from said calender to said laminating rolls.

24. Apparatus for the manufacture of a laminated covering of the character described comprising a vinyl plastic sheet bonded to a fabric base sheet which comprises in combination feeding means for continuously feeding a fabric base sheet, laminating rolls, means for rotating said laminating rolls, means for exerting pressure at the nip between said laminating rolls, means for directing the travel of said base sheet from said feeding means into the nip between said laminating rolls, means for applying a coating of liquid adhesive material to one surface of said sheet during its travel from said feeding means to said laminating rolls, means for heat drying the applied coating during continuance of said travel of said sheet, means for heat-activating said coating during a subsequent portion of said travel of said sheet, and means for continuously feeding a vinyl plastic sheet into the nip between said laminating rolls in pressure contact with said coating on said surface of said felt sheet.

25. Apparatus according to claim 24 wherein said means for heat-activating said coating comprises infra red lamp means adapted and arranged to direct infra red rays directly onto said coating during the portion of the travel of said felt sheet approaching and adjacent said laminating rolls.

26. Apparatus according to claim 24 which includes means for heating said base sheet during said travel thereof prior to the point of application of said coating.

27. Apparatus for the manufacture of a laminated covering of the character described comprising a vinyl plastic sheet bonded with a fabric base sheet which comprises in combination feeding means for continuously feeding a fabric base sheet, a pair of laminating rolls, means for rotating said laminating rolls, means for exerting pressure at the nip between said laminating rolls, means for directing the travel of said base sheet from said feeding means into the nip between said laminating rolls, means for applying a coating of liquid adhesive material to one surface of said base sheet during said travel from said feeding means to said laminating rolls, means for applying heat to the surface of said base sheet opposite to that to which said coating is applied during said travel of said base sheet, infra red lamp means adapted and arranged to direct infra red rays directly onto said coating during a subsequent portion of said travel of said base sheet adjacent said laminating rolls, and means for continuously feeding a vinyl plastic sheet into the nip between said laminating rolls in pressure contact with said coating on said surface of said base sheet.

28. Apparatus according to claim 27 wherein said means for applying heat to the surface of said base sheet opposite to that to which said coating is applied is adapted and arranged to so apply said heat to said surface during a portion of said travel of said base sheet following and adjacent the point of application of said adhesive coating.

29. A laminated flexible covering of the character described which comprises a base sheet of bitumen impregnated felt and a vinyl plastic sheet bonded together by a layer of adhesive material disposed between and in direct contact with each of said sheets, said layer of adhesive material consisting of dried latex emulsion wherein the solids consist essentially of from about 60 to 70 parts by weight of buna rubber and 30 to 40 parts by weight of wood rosin extract having a softening point of about 234° F. to about 239° F.

References Cited in the file of this patent

UNITED STATES PATENTS

| | | |
|---|---|---|
| 386,926 | Lucas | July 31, 1888 |
| 1,784,797 | Weinheim | Dec. 9, 1930 |
| 1,852,451 | Everett | Apr. 5, 1932 |
| 2,014,460 | Alm | Sept. 17, 1935 |
| 2,081,308 | Rowe | May 25, 1937 |
| 2,154,474 | Scott | Apr. 18, 1939 |
| 2,321,937 | Quinn | June 15, 1943 |
| 2,410,361 | Prance | Oct. 29, 1946 |
| 2,511,703 | Ettl | June 13, 1950 |
| 2,590,032 | Petry | Mar. 18, 1952 |
| 2,618,579 | Brajer | Nov. 18, 1952 |
| 2,640,799 | Grangaard | June 2, 1953 |
| 2,649,425 | Hulse | Aug. 18, 1953 |
| 2,654,415 | Benedict et al. | Oct. 6, 1953 |

FOREIGN PATENTS

| | | |
|---|---|---|
| 283,907 | Italy | Mar. 26, 1931 |